(12) United States Patent
Regan et al.

(10) Patent No.: US 6,578,086 B1
(45) Date of Patent: Jun. 10, 2003

(54) DYNAMICALLY MANAGING THE TOPOLOGY OF A DATA NETWORK

(75) Inventors: Joseph Regan, Sunnyvale, CA (US); Alfred Nothaft, Keller, TX (US)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/405,982

(22) Filed: Sep. 27, 1999

(Under 37 CFR 1.47)

(51) Int. Cl.[7] .................. G06F 15/173; H04L 12/28
(52) U.S. Cl. .................. 709/242; 709/238; 370/254
(58) Field of Search .................. 709/242, 238, 709/246, 251, 252, 221, 54; 370/254, 292, 362, 399, 412

(56) References Cited

U.S. PATENT DOCUMENTS

| | | | |
|---|---|---|---|
| 4,545,013 A | 10/1985 | Lyon et al. |
| 4,639,861 A | 1/1987 | Appiano et al. |
| 4,644,532 A | 2/1987 | George et al. |
| 4,827,411 A | 5/1989 | Arrowood et al. |
| 4,847,830 A | 7/1989 | Momirov |
| 4,984,264 A | 1/1991 | Katsube |
| 5,012,466 A | 4/1991 | Buhrke et al. |
| 5,031,093 A | 7/1991 | Hasegawa |
| 5,038,343 A | 8/1991 | Lebizay et al. |
| 5,049,873 A | 9/1991 | Robins et al. |
| 5,062,103 A | 10/1991 | Davidson et al. |
| 5,079,767 A | 1/1992 | Perlman |
| 5,101,348 A | 3/1992 | Arrowood et al. |
| 5,113,499 A | 5/1992 | Ankney et al. |
| 5,140,585 A | 8/1992 | Tomikawa |
| 5,150,356 A | 9/1992 | Tsutsui |
| 5,150,464 A | 9/1992 | Sidhu et al. |
| 5,164,938 A | 11/1992 | Jurkevich et al. |
| 5,165,091 A | 11/1992 | Lape et al. |
| 5,177,736 A | 1/1993 | Tanabe et al. |
| 5,214,642 A | 5/1993 | Kunimoto et al. |
| 5,237,569 A | 8/1993 | Sekihata et al. |
| 5,249,178 A | 9/1993 | Kurano et al. |
| 5,251,204 A | 10/1993 | Izawa et al. |
| 5,253,247 A | 10/1993 | Hirose et al. |
| 5,255,264 A | 10/1993 | Cotton et al. |
| 5,280,610 A | 1/1994 | Travis, Jr. et al. |
| 5,287,355 A | 2/1994 | Takahashi et al. |
| 5,287,535 A | 2/1994 | Sakagawa et al. |
| 5,303,078 A | 4/1994 | Brackett et al. |
| 5,303,343 A | 4/1994 | Ohya et al. |
| 5,307,465 A | 4/1994 | Iki |
| 5,307,491 A | 4/1994 | Feriozi et al. |
| 5,309,434 A | 5/1994 | Maekawa |
| 5,313,463 A | 5/1994 | Gore et al. |
| 5,321,813 A | 6/1994 | McMillen et al. |
| 5,327,420 A | 7/1994 | Lyles |
| 5,327,486 A | 7/1994 | Wolf et al. |
| 5,339,318 A | 8/1994 | Tanaka et al. |
| 5,345,446 A | 9/1994 | Hiller et al. |
| 5,345,558 A | 9/1994 | Opher et al. |

(List continued on next page.)

Primary Examiner—Frantz B. Jean
(74) Attorney, Agent, or Firm—Blakely Sokoloff Taylor & Zafman LLP (57) ABSTRACT

A network device is presented comprising a filtering database, a link state database and a controller, coupled to each of the filtering database and the link state database, to process data received from remote network devices based, at least in part, on distance vector information stored in the filtering database, link state information stored in the link state database, and content of the received data.

21 Claims, 5 Drawing Sheets

U.S. PATENT DOCUMENTS

| | | |
|---|---|---|
| 5,390,170 A | 2/1995 | Sawant et al. |
| 5,390,173 A | 2/1995 | Spinney et al. |
| 5,432,777 A | 7/1995 | LeBoudec et al. |
| 5,432,790 A | 7/1995 | Hluchyj et al. |
| 5,440,547 A | 8/1995 | Easki et al. |
| 5,457,681 A | 10/1995 | Gaddis et al. |
| 5,459,724 A | 10/1995 | Jeffrey et al. |
| 5,479,401 A | 12/1995 | Bitz et al. |
| 5,519,707 A | 5/1996 | Subramanian et al. |
| 5,528,759 A | 6/1996 | Moore |
| 5,535,195 A * | 7/1996 | Lee .............................. 370/54 |
| 5,542,047 A | 7/1996 | Armstrong |
| 5,557,747 A | 9/1996 | Rogers et al. |
| 5,640,504 A * | 6/1997 | Johnson, Jr. |
| 5,825,772 A * | 10/1998 | Dobbins et al. ............. 370/396 |
| 6,021,132 A * | 2/2000 | Muller et al. ................ 370/412 |
| 6,026,077 A * | 2/2000 | Iwata .......................... 370/254 |
| 6,069,895 A * | 5/2000 | Ayandeh ..................... 370/399 |
| 6,208,623 B1 * | 3/2001 | Rochberger et al. ........ 370/254 |
| 6,212,185 B1 * | 4/2001 | Steeves et al. .............. 370/292 |
| 6,219,697 B1 * | 4/2001 | Lawande et al. ........... 709/221 |
| 6,256,295 B1 * | 7/2001 | Callon ........................ 370/254 |
| 6,333,929 B1 * | 12/2001 | Drottar et al. ............... 370/362 |
| 6,392,990 B1 * | 5/2002 | Tosey et al. ................ 370/218 |

* cited by examiner

DYNAMICALLY MANAGING THE TOPOLOGY OF A DATA NETWORK

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise expressly reserves all rights whatsoever in said copyright works.

BACKGROUND

1. Field

The present invention relates to the field of networking and, in particular, to a method and apparatus for dynamically managing the topology of a data network.

2. Background Information

As computer technology has evolved, so too has the use of data networks to communicatively couple computer systems together, enabling them to communicate with one another. Data networks come in many different sizes and network topologies. From small peer-to-peer networks enabling multiple users of a small office to share data, to more formal local area networks (LAN), wide-area and global data networks (e.g., the Internet). Those skilled in the art will appreciate that the management of such data networks has become a mission critical function for many enterprises.

One commonly used measure of network performance and manageability is the time required by network core devices to identify optimal routing paths (or, re-routing in the event of failure) between network elements, a measure colloquially referred to as a network's "convergence time". Those skilled in the art will appreciate that convergence is not an easy task, as there often exists a number of alternate paths to each network element, often resulting in undesirable physical loops. Accordingly, many network devices utilize routing protocols with convergence algorithms that are designed to identify and eliminate unwanted physical loops. The complexity of the routing protocol and, consequently, the convergence algorithm is often dictated by the processing power of the network devices populating the network and the network layer of interest.

The processing power of network devices varies between devices and, quite often, on which "layer" of the network the device is to operate. Those skilled in the art will appreciate that use of the term "network layer" refers to the layers defined in the Open System Interconnection (OSI) network model. Routers operating at the network layer (layer 3), for example, are typically configured with more processing power and memory than bridges (or switches, which are really just multiport bridges) operating at the link or Media Access Control (MAC) layer (layer 2). Accordingly, the protocols employed by network devices vary depending upon which network layer is being discussed.

In general, there are two types of convergence protocols: link state protocols and distance vector protocols. Link state protocols are typically used by routers in layer 3 of the network to identify optimal network routing paths by flooding routing information to all of the network devices resident within that layer of the data network. In accordance with the link state protocol, each network device sends only that portion of the routing table that describes the state of its own links. One popular example of a link state protocol is the Open Shortest Path First (OSPF) protocol developed and standardized by the Internet Engineering Task Force (IETF).

In contrast, distance vector algorithms are typically utilized by bridges to identify the optimal network routing paths at the link layer (e.g., layer 2) of the OSI network model. A popular prior art distance vector algorithm utilized in layer 2 convergence protocols is the Spanning Tree Protocol (STP), developed by Radia Perlman and standardized in IEEE 801.2d. STP is a protocol designed to allow bridges to map a network topology (e.g., the active topology) while eliminating loops which could lead to broadcast storms essentially crippling network performance. Those skilled in the art will appreciate, however, that as network traffic has increased, the popularity of the STP as a network management protocol has diminished due to the inherent latency required to establish new routing paths once a fault has been detected. In some instances, it may take several minutes to reconnect a network device that has been isolated due to a fault in the network. Due to the relatively lengthy convergence times associated with STP, networking administrators have been pressuring device manufacturers for an improved layer 2 networking device that reduces or eliminates the reliance on distance vector algorithms to control the network topology of a data network.

Several solutions have been proposed and implemented in switching products by various vendors, most of which come in the form of a proprietary enhancement to the STP standard protocol. One example of just such a solution is the UplinkFast™ technology from Cisco Systems Inc. of San Jose, Calif. The Spanning Tree UplinkFast™ protocol is designed to improve convergence time, while still adhering to the basic STP standard. Simplistically, the UplinkFast™ solution creates virtual groups of ports into uplink groups wherein the STP configures ports an uplink group at a time. One of the limitations of the UplinkFast™ solution, however, is that it physically turns links off when potential loops are identified. Those skilled in the art will appreciate that turning off a link, as done in the UplinkFast™ solution, eliminates the possibility for redundancy, thereby increasing the convergence time should a link fail. In addition, although the UplinkFast™ approach has, indeed, reduced the time required for basic STP convergence, it is an incremental improvement at best.

Another drawback of the STP is its inability to accommodate load balancing, and other more advanced network services such as Quality of Service (QoS). That is, insofar as the STP establishes an active topology void of redundant paths and loops, it forecloses any opportunity for load sharing among multiple links leading to the same point insofar as those multiple links may well represent a broadcast loop. To date, this limitation of the distance vector protocols have not been addressed by device manufacturers.

Thus, it would be desirable to provide an innovative solution that improves convergence time while providing for load sharing and other advanced network services, without negatively affecting network reliability attributes. More specifically, a method and apparatus for dynamically managing the topology of a data network that is unencumbered by the inherent deficiencies and limitations commonly associated with the spanning tree protocol and other prior art solutions.

SUMMARY

In accordance with the teachings of the present invention, a method and apparatus for dynamically managing the topology of a data network is provided. In particular, in accordance with one embodiment of the present invention, the apparatus comprises a filtering database, a link-state database, and a controller. Coupled to each of the filtering database and the link-state database, the controller processes data received from remote network devices based, at least in part, on distance vector information stored in the filtering database, link state information stored in the link state database, and content of the received data.

Other aspects and features of the present invention will become apparent to those ordinarily skilled in the art upon review of the following description of specific embodiments of the invention in conjunction with accompanying figures.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION

In the following description, various aspects of the present invention will be described. However, it will be apparent to those skilled in the art that the present invention may be practiced with only some or all aspects of the present invention. For purposes of explanation, specific numbers and configurations are set forth in order to provide a thorough understanding of the present invention. However, it will also be apparent to those skilled in the art that the present invention may be practiced without these specific details. In other instances, well known features are omitted or simplified for clarity. References in the specification to the term "embodiment" mean that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

In alternative embodiments, the present invention may be applicable to implementations of the invention in integrated circuits or chip sets, wireless implementations, switching systems products and transmission systems products. For purposes of this application, the terms "switching systems products" shall be taken to mean private branch exchanges (PBXs), central office switching systems that interconnect subscribers, toll/tandem switching systems for interconnecting trunks between switching centers, and broadband core switches found at the center of a service provider's network that may be fed by broadband edge switches or access multiplexers, and associated signaling and support systems and services. The term "transmission systems products" shall be taken to mean products used by service providers to provide interconnection between their subscribers and their networks such as loop systems, and which provide multiplexing, aggregation and transport between a service provider's switching systems across the wide area, and associated signaling and support systems and services.

When implemented as software in a network device, the elements of the present invention are essentially code segments to perform particular tasks. The program or code segments can be stored in a readable medium or transmitted by signaling (e.g., jackets, etc.) embodied in a carrier wave or digital bit stream over a transmission medium or communication link. The "readable medium" may include any medium that can store or transfer information. Examples of the readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc.

Those skilled in the art will appreciate, from the description to follow, that the present invention is directed to a method and apparatus for dynamically managing the topology of a data network by inclusion of a link state protocol database (LSPD) in certain network devices, and the addition of a link state protocol to layer 2 of the data network managed by a distance vector protocol. It should be noted that the link state protocol extensions associated with one aspect of the present invention may well be implemented in alternate embodiments as an extension to any of a number of known data network topology management protocols, or as a stand-alone protocol. Accordingly, those skilled in the art will appreciate that the present invention can be practiced within prior art networks that do not recognize the LSPDU extensions, thereby enabling data networks and network devices incorporating the teachings of the present invention to beneficially interface with data networks and network devices that do not incorporate the teachings of the present invention.

Figure 1:
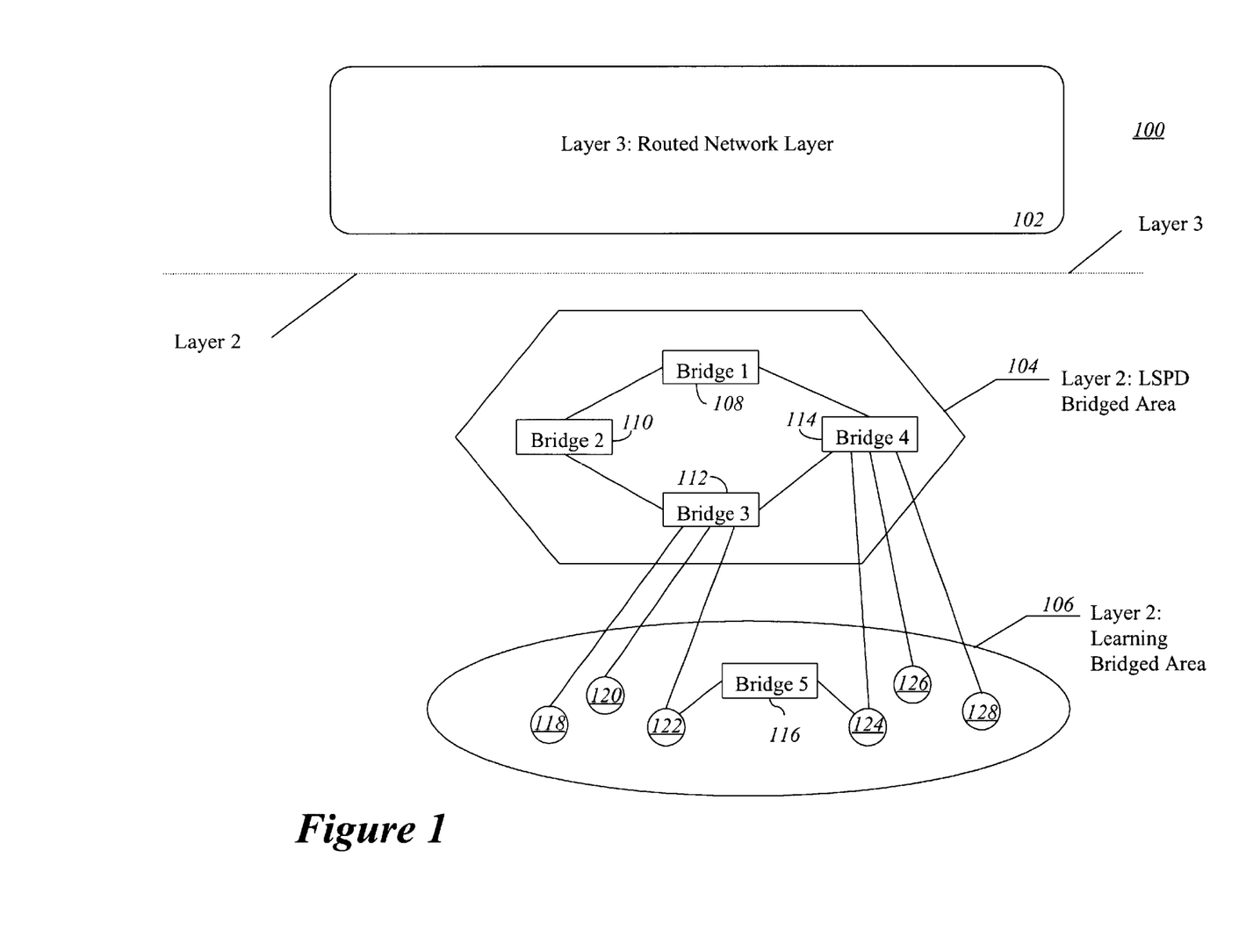
FIG. 1 illustrates a block diagram of an illustrative embodiment of a data network incorporating the teachings of the present invention.

Referring to FIG. 1, an illustrative embodiment of a data network comprising at least one network device incorporating the present invention is shown. Data network 100 comprises a routed layer 3 network layer 102, an innovative link state protocol layer 2 network layer 104 incorporating the teachings of the present invention, to be described more fully below, and a layer 2 learning bridge network layer 106, communicatively coupled as shown. Within the innovative link state protocol layer 2 network layer 104, data network 100 comprises four communicatively coupled bridges, e.g., bridge 1 108, bridge 2 110, bridge 3 112 and bridge 4 114. As shown, bridge 3 112 is communicatively coupled to clients 118, 120 and 122, while bridge 4 114 is communicatively coupled to clients 124, 126 and 128, respectively. Layer 2 learning bridge network layer 106 comprises bridge 5 116, communicatively coupled to clients 122 and 124, respectively. In accordance with this illustrative embodiment, bridge 5 116 employs the prior distance vector protocol and learning processes to manage the topology of the layer 2 learning bridge network layer 106.

In contrast, bridges 108–114 include a link state protocol database and employ link state protocol extensions to dynamically manage the active topology of the link state protocol layer 2 network layer 104 in accordance with the teachings of the present invention, to be described more fully below. Those skilled in the art will appreciate, from the description to follow, that the introduction of the innovative link state protocol database along with the link state protocol extensions into the layer 2 of the network facilitate faster convergence times and the introduction of advanced network services heretofore not accessible within layer 2 of the data network. Having introduced the operating environment of the present invention with reference to FIG. 1, an example network device incorporating the teachings of the present invention is present in accordance with FIG. 2.

Figure 2:
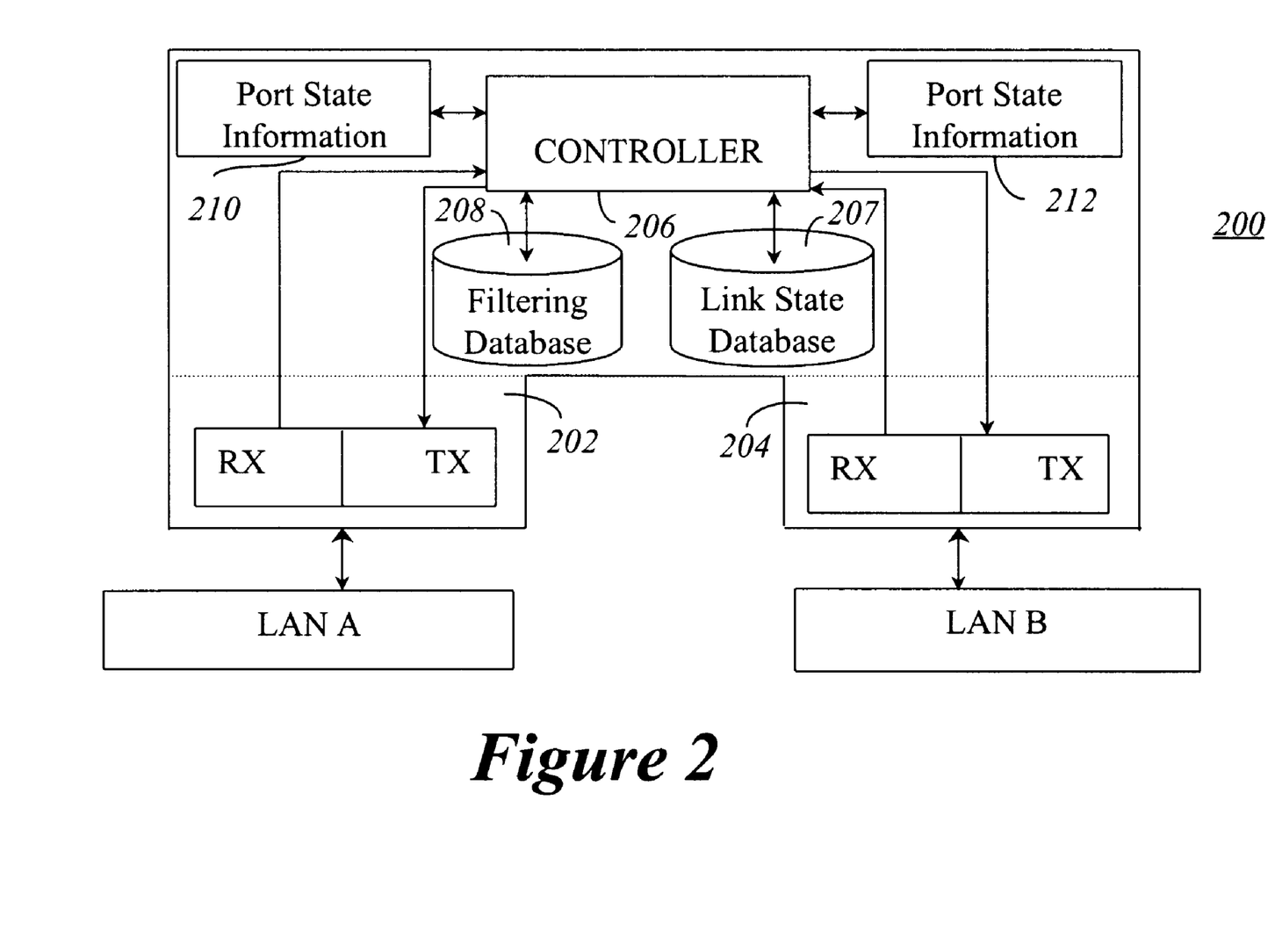
FIG. 2 illustrates a block diagram of an illustrative embodiment of a network device incorporating the teachings of the present invention.

Referring now to FIG. 2, a block diagram an illustrative embodiment of a network device incorporating the teachings of the present invention is shown. In accordance with one embodiment of the present invention, network device 200 incorporating the teachings of the present invention may well be introduced to data network 100 of FIG. 1 as one or more of bridges 108–114. Furthermore, as will be described in greater detail below, network device 200 is also capable of executing the spanning tree protocol and learning processes in order to interface with devices in the layer 2 learning bridge network layer 106 and, indeed, be incorporated into the layer 2 learning bridge network layer 106 as bridge 116.

As depicted in FIG. 2, network device 200 is shown comprising a controller 206 and a link state protocol database (LSPD) 207, which work in conjunction with an innovative set of link state protocol extensions (e.g., link state protocol data units "LPSDUs") to dynamically manage the active topology of layer 2 of the data network. Those skilled in the art will appreciate, from the description to follow, that network device 200 incorporating link state protocol database 207 and adhering to the innovative set of link state protocol extensions facilitates active control of layer 2 of the data network without resorting to the blocking or disabling of I/O ports commonly associated with prior art distance vector protocols. In addition, link state protocol database 207 and its associated link state protocol serve to decrease the convergence time of layer 2 of the data network (as compared to distance vector management), thereby improving the perceived manageability and responsiveness. These and other aspects of the present invention will be apparent to those skilled in the art based on the description to follow. In addition to controller 206 and link state protocol database 207 introduced above, network device 200 further comprises a plurality of input/output (I/O) ports 202 and 204, port state information tables 210 and 212, and a filtering database 208, each communicatively coupled as depicted. Although network device 200 features two I/O ports (e.g., ports 202 and 204) in this embodiment, those skilled in the art will appreciate that the invention may be practiced with more I/O ports.

In one embodiment, I/O ports 202 and 204 each comprise a transceiver (not specifically denoted) to receive data from and transmit data to a communicatively coupled data network. Accordingly, I/O ports 202 and 204 provide the physical interface between network device 200 and individual data networks, thereby bridging the individual data networks. The general operation of I/O ports 202 and 204 are well known to those in the art and, thus, need no further description.

Port state information tables 210 and 212, respectively, are utilized by network device 200 to maintain the port state information for I/O ports 202 and 204 of network device 200. In accordance with the illustrative embodiment of FIG. 2, network device 200 has a dedicated port state information table for each I/O port 202 and 204. In an alternate embodiment, however, a single port state information table may well be used, wherein the information for each of the plurality of I/O ports is separately denoted within the single table. Those skilled in the art will appreciate that the information contained within the port state information table can vary from network to network depending on, for example, the network architecture and the type of network devices deployed throughout the network. In one embodiment, for example, each record of port state information tables 210 and 212 includes a port identifier (port ID) associated with the I/O port, the path cost associated with the I/O port, and the operating "state" of the I/O port. In one embodiment, network device 200 supports five distinct operating port states associated with the distance vector mode of operation—a blocking state, a listening state, a learning state, a forwarding state and a disabled state.

Those skilled in the art will appreciate that the particular operating state of each I/O port (set by controller 206) determines whether data frames and management data units (e.g., Bridge Protocol Data Units "BPDU"s) received at the port will be acted upon by network device 200, and whether the port will be included in the active network topology determination using the prior art distance vector protocols. In accordance with the teachings of the present invention, to be described more fully below, control of the operating state of a particular I/O port of network device 200 can be controlled by an innovative set of link state protocol extensions, in addition to prior art distance vector protocols (e.g., the spanning tree protocol). Whereas the prior art distance vector protocols rely on blocking/disabling ports and links to eliminate parallel links in managing the active topology (e.g., utilizing the five port states described above), the innovative link state protocol described below does not resort to altering the operating state of individual ports/links to manage the active topology. Rather, the innovative link state protocol enables network device 200 to preserve the previously un-utilized parallel links for use in load sharing, providing quality of service (QoS) features, and the like.

With continued reference to FIG. 2, filtering database 208 stores and retrieves information typically passed within a distance vector protocol (e.g., STP). In one embodiment, controller 206 utilizes the distance vector protocol information stored within filtering database 208 to determine the active topology of a layer 2 network. Accordingly, filtering database 208 retains network topology information that is either explicitly configured by management action (e.g., by the network administrator) or by the learning process and algorithm associated with the operation of the spanning tree protocol.

In accordance with one aspect of the present invention, link state protocol database 207 is used by network device 200 to store and retrieve link state information of a host bridged data network (e.g., data network 100). In one embodiment, the link state information is provided by remote network devices by passing link state protocol data units (LSPDUs), to be described more fully below. Accordingly, whereas filtering database 208 retains filtering information associated with the distance vector protocol, the link state protocol database 207 retains link state information denoted within messages adhering to the innovative link state protocol, enabling controller 206 to dynamically compute the active network topology based on the link state information and/or distance vector information.

In one embodiment, controller 206 is responsible for executing all management operations or processes associated with network device 200. In one embodiment, for example, controller 206 operates the link state protocol, in conjunction with other network devices, to determine an active network topology. In an alternate embodiment, controller 206 operates the link state protocol in addition to a distance vector protocol, in conjunction with other network devices operating the link state protocol and/or the distance vector protocol, to determine an active network topology. Thus, in accordance with one aspect of the present invention, to be described more fully below, controller 206 updates the information contained within filtering database 208 based on information received in the link state protocol data units. That is, in accordance with one embodiment of the present invention, controller 206 translates a link state protocol data unit into routing cost and port state information commonly stored in filtering database 208, while translating BPDUs into link state information commonly stored in link state protocol database 207, thereby ensuring the cross compatibility of network device 200. As used herein, controller 206 is intended to represent any of a number of alternative processing devices known in the art. Examples of such devices include, but are not limited to a microprocessor, a microcontroller, an application specific integrated circuit (ASIC), a programmable logic array (PLA), a special purpose controller, and the like. Thus, controller 206 may well take many alternate forms without deviating from the spirit and scope of the present invention.

Having described the architecture of network device 200 in accordance with one aspect of the present invention, the innovative layer 2 link state protocol extensions will now be described with reference to FIG. 3. In accordance with the illustrative embodiment of FIG. 3, a graphical illustration of an example link state protocol data unit (LSPDU) format is presented.

Figure 3:
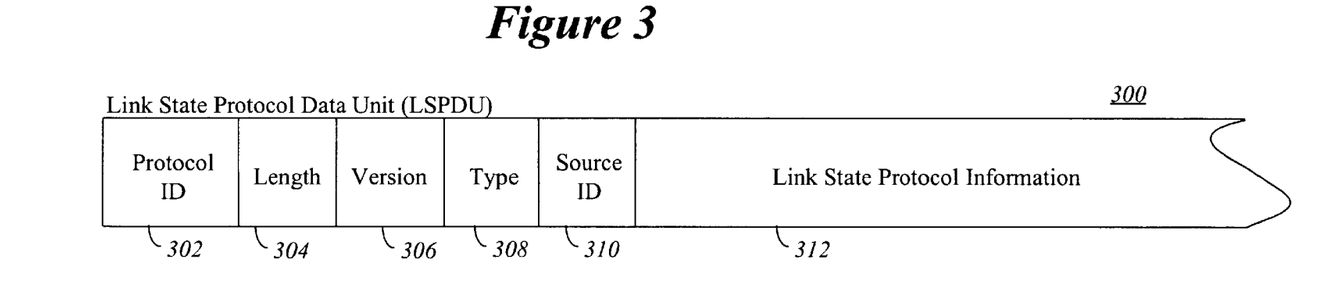
FIG. 3 is a block diagram of an illustrative embodiment of a Link State Protocol Data Unit (LSPDU) incorporating the teachings of the present invention.

In accordance with the illustrated example embodiment of FIG. 3, link state protocol data unit (LSPDU) 300 is shown supporting six (6) discrete fields of information. In one embodiment, the six fields include a protocol identification field 302, a length field 304, a version field 306, a type field 308, a source identification field 310, and a the link state protocol information field 312. As used herein, protocol ID field 302 identifies to controller 206 which management protocol the data unit is associated with, i.e., specifically identifying the data unit as a link state protocol data unit. In one embodiment, for example, protocol ID field 302 of LSPDU 300 is always set to 0x1000000 to denote the link state protocol. In another embodiment, protocol ID field 302 of LSPDU 300 is always set to "1" to denote the link state protocol. Length field 304 and version field 306 are employed to denote the length of LSPDU 300 and the version of the link state protocol being used, respectively. Source identification field 310 is used to uniquely identify the network device that has issued LSPDU 300. In one embodiment, for example, source ID field 310 includes a unique address associated with the advertising network device.

Type field 308 denotes the type of message carried by LSPDU 300 (e.g., the "personality" of the data unit). In accordance with one embodiment of the present invention, three (3) distinct LSPDU types are supported—a hello message, a link state update message, and an acknowledge message. Those skilled in the art will appreciate that other/alternate messages may be used in alternate embodiments without deviating from the spirit and scope of the present invention. In one, embodiment, a hello message is denoted as type "00", while the link state update message is denoted as type "01" and the acknowledgement message is denoted in type field 308 as "11".

In accordance with one embodiment of the present invention, the hello (00) type, LSPDU 300 is sent as a configuration message by an appropriately configured network device (e.g., network device 200) during a power-up or initialization phase of the network device. The hello (00) type LSPDU 300 carries information in link state protocol information field 312 denoting the status of each of its I/O ports and the links coupled thereto. The hello (00) type LSPDU 300 is broadcast on all ports/links of network device 200 and does not require the receiving network devices to issue an acknowledgement. In one embodiment, all appropriately configured network devices receiving a hello (00) type LSPDU 300 will reply with a link state update (01) type LSPDU.

The link state update (01) LSPDU 300 is utilized by appropriately configured network devices (e.g., network device 200) to indicate a change in status of one of its ports/links. The link state update (01) LSPDU 300 is directed to all known network devices, e.g., those identified within its link state protocol database 207, and an acknowledgement message is required from all network devices receiving the link state update (01) LSPDU 300.

As its name implies, the acknowledgement (11) type LSPDU 300 is sent by receive network devices to acknowledge receipt of a link state update (01) type LSPDU. In one embodiment, a network device may well issue an acknowledgement (11) type LSPDU in response to hello (00) type LSPDU's, even though an acknowledgement may not be required.

Associated with each LSPDU type is a unique set of link state protocol information provided in link state protocol information field 312, which is utilized by controller 206 and link state protocol database 207 to dynamically manage the active topology of the layer 2 data network. The size and information contained in link state protocol information field 312 of the LSPDU 300 can vary from network implementation to network implementation. In accordance with one embodiment, link state protocol information field 312 will contain at a minimum the information tracked in the link state protocol database 207 of appropriately configured network devices. An example of a link state protocol database 207 is provided with reference to FIG. 4.

Figure 4:
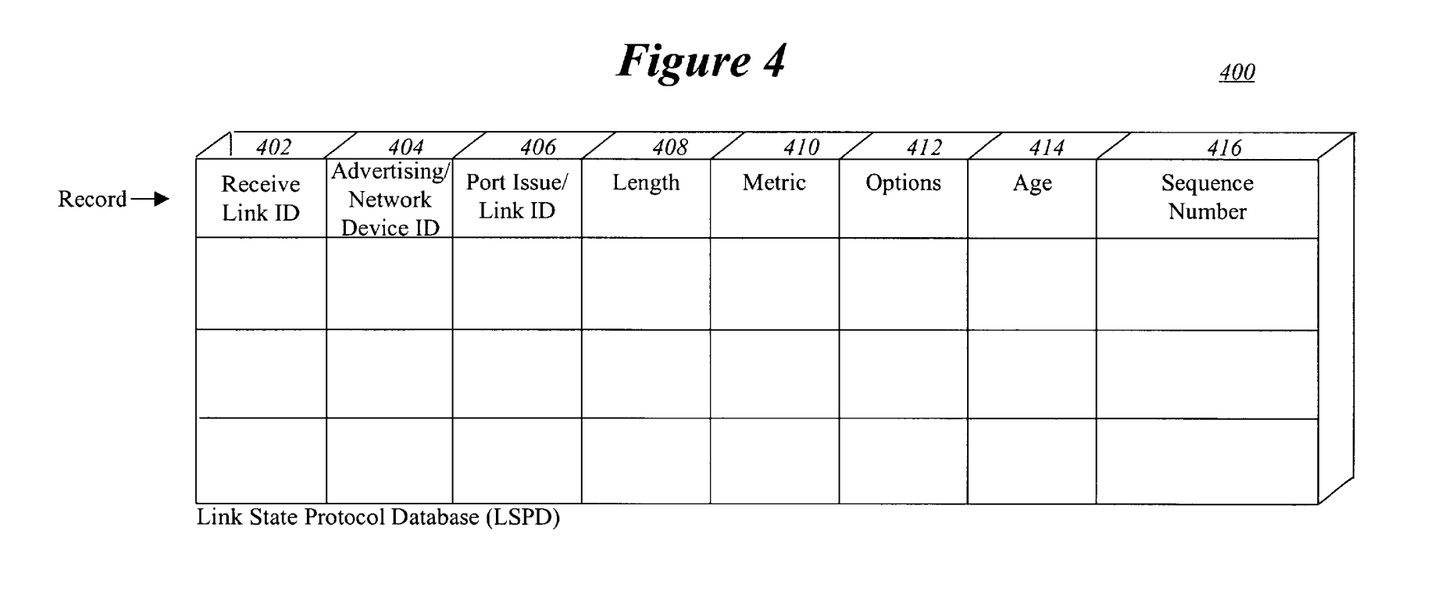
FIG. 4 is a block diagram of an embodiment of a Link State Protocol Database (LSPD) incorporating the teachings of the present invention.

Turning briefly to FIG. 4, a graphical illustration of an example link state protocol database (LSPD) 400 is presented incorporating the teachings of the present invention, in accordance with one aspect of the present invention. In one embodiment, LSPD 400 may well be integrated with network device 200 as link state protocol database 207. In accordance with the illustrated example embodiment of FIG. 4, a record of LSPD 400 is presented comprising a receive link identification (ID) field 402, an advertising network device ID field 404, an issue link ID field 406, a length field 408, a metric field 410, an options field 412, an age field 414 and a sequence number field 416. Those skilled in the art will appreciate, however, that link state protocol database 400 may well be practiced with greater or lesser complexity without deviating from the spirit and scope of the present invention. Thus, LSPD 400 is intended to be illustrative, and not limiting, of the teachings of the present invention.

In one embodiment of the present invention, advertising network device ID field 404 of LSPD 400 is populated with information received from source ID field 310 of LSPDU 300 header of FIG. 3. Similarly, length field 408 of link state protocol database 400 is populated with information received from length field 304 of LSPDU 300 header of FIG. 3. Receive link ID field 402 is populated with the unique moniker identifying the port/link on which LSPDU 300 of FIG. 3 was received. The remaining fields are populated with information residing in the link state protocol information field 312 of LSPDU 300 of FIG. 3.

Issue link ID field 406 denotes the port/link of the network device issuing LSPDU 300 associated with the information contained in link state protocol information field 312. As used herein, metric field 410 is populated with information quantifying the "cost" of utilizing the link between the ports identified in fields 402 and 406, e.g., the receiving port and the issuing port, respectively. In one embodiment, for example, metric field 410 may provide the number of hops necessary to reach the port identified in issue link ID field 406. In an alternate embodiment, for example, metric field 410 may provide some indication in the time latency to be encountered sending a data packet to the port identified in issue link ID field 406. Options field 412 denotes what, if any, service options (e.g., QoS, etc.) are supported between the ports identified in fields 402 and 406, respectively. Age field 414 denotes when information contained in the record expires, thereby requiring a further link state update (01) type LSPDU 300 to refresh the information contained within the record. Sequence number field 416 is utilized to identify common LSPDUs 300 which may have been received on different links of the receiving network device.

Figure 5:
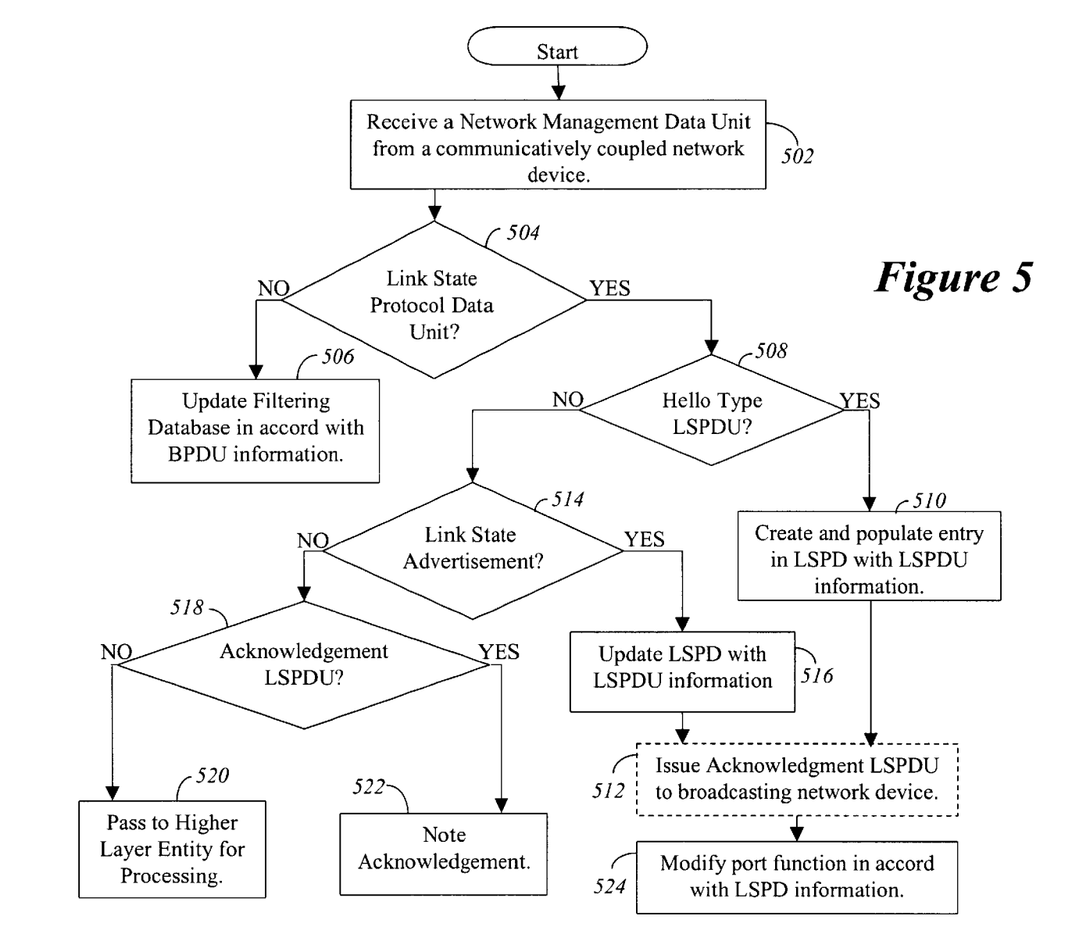
FIGS. 5 and 6 illustrate flow charts of an illustrative embodiment of managing a data network.
Figure 6:
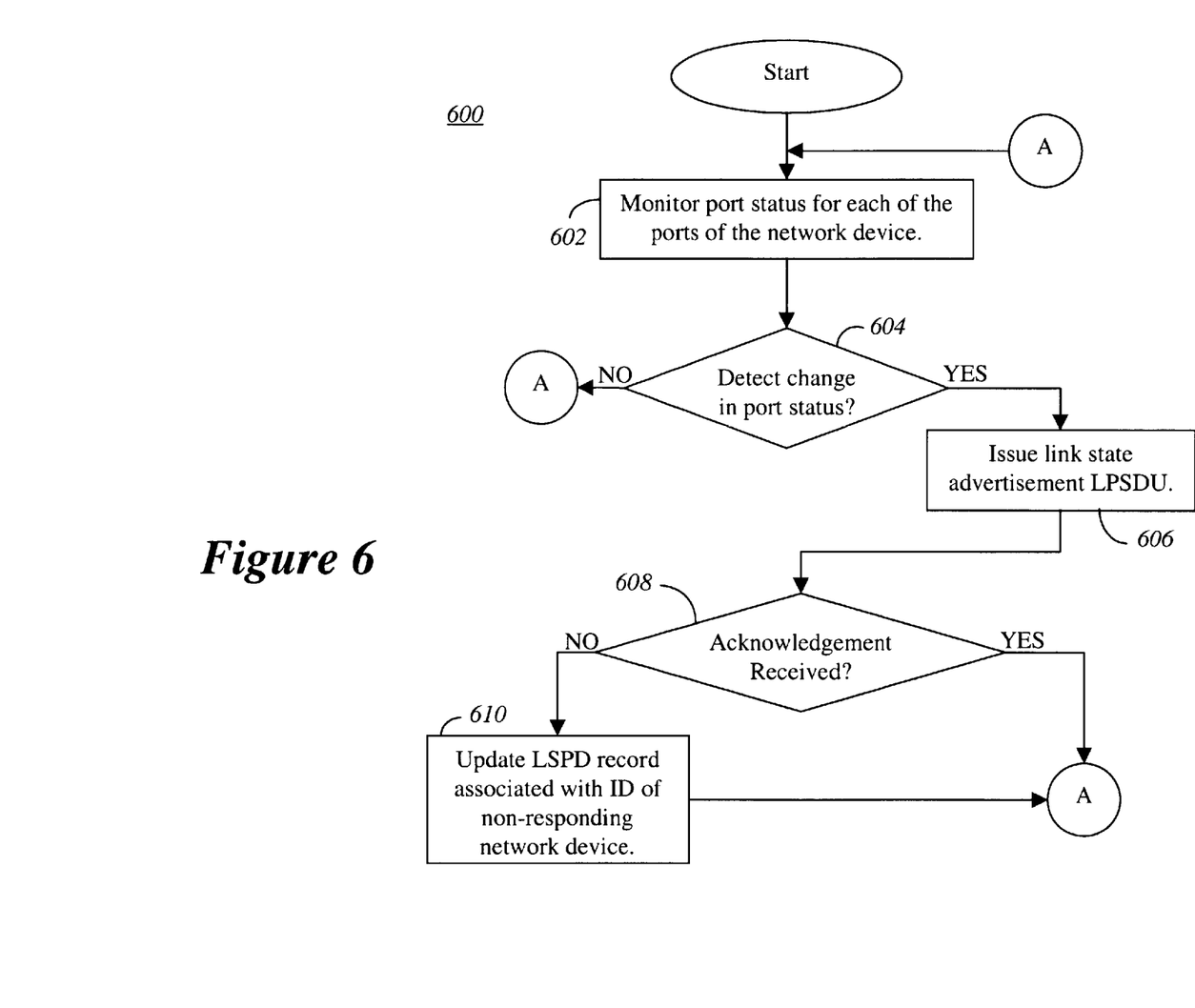

Given the foregoing architectural description of network device 200 presented in FIG. 2, and the layer 2 link state protocol extensions of FIG. 3, an example method for dynamically managing the active topology of a layer 2 data network incorporating the teachings of the present invention will now be developed with reference to FIGS. 5 and 6. More specifically, FIGS. 5 and 6 feature an illustrative method for receiving and sending messages in accordance with the link state protocol extensions to establish and maintain link state information in the link state protocol database of network devices. For ease of explanation, and not limitation, the example method depicted in FIGS. 5 and 6 will be developed in accordance with continued reference to FIGS. 1, 2 and 3.

With reference to FIG. 5, a flow chart illustrating an example method for dynamically managing the active topology of a data network is presented, in accordance with one embodiment of the present invention. In accordance with the illustrated example embodiment of FIG. 5, controller 206 monitors I/O ports 202 and 204 for receipt of management data units, e.g., BPDUs or LSPDUs 300 (block 502). Upon receipt of a management data unit, a determination is made whether it is an LSPDU (at block 504). In one embodiment, the determination is made from information embedded in the management data unit itself, e.g., checking the protocol identification of the LSPDU, for example. If it is determined that the received management data unit is not a LSPDU, it is assumed to be associated with another management data protocol, e.g., a STP BPDU, and the database associated with that protocol is updated to reflect the information contained within the management data unit (block 506).

However, if the received management data unit is a LSPDU, a further determination is made as to the type of LSPDU has been received by examining the type field of the LSPDU. For example, a determination is made whether the LSPDU is a hello (00) type LSPDU, denoting the start-up or reset of a network device (block 508). If so, an entry corresponding to the received hello (00) type LSPDU is created in the link state protocol database and populated with the information contained in the LSPDU (block 510). In one embodiment, a receiving network device may issue an acknowledgement type (11) LSPDU in response to receiving a hello (00) type LSPDU, although one is not required (block 512).

At block 524, the receiving network device may modify the function of one or more ports in response to the information contained within the received LSPDU.

If the received LSPDU is not a hello (00) type LSPDU, a determination is made whether the LSPDU is a link state update (01) type LSPDU (block 514). If so, the controller updates the link state protocol database with the updated link state information contained within the LSPDU (block 516) and modifies the function of one or more ports, as appropriate, in response to the information contained within the received LSPDU (block 524). The acknowledge is optional.

If the received LSPDU is not a link state update (01) type LSPDU 300, a determination is made whether the LSPDU is an acknowledgement (11) type LSPDU 300 (block 518). If so, the controller notes the acknowledgement (block 522). In one embodiment, the controller notes the acknowledgement by refreshing the age information contained in the link state protocol database in the record associated with the source ID field of the acknowledgement (11) type LSPDU 300. If, however, it is determined that the received management data unit is not an acknowledgement, it is passed to a higher layer network entity (e.g., layer 3, layer 4, etc.) for processing (block 520) in accordance with one embodiment of the present invention.

Having described the operation of network device 200 upon receipt of a data management unit in FIG. 5, a method for controlling issuance of management data units is provided with reference to FIG. 6. As shown in FIG. 6, the method begins upon the occurrence of a start-up or reset event wherein the controller broadcasts a hello (00) type LSPDU with link state information to communicatively coupled network devices (block 602). At block 604, the network device monitors the I/O ports and their associated port state information table(s), for change in the status of the ports. If the controller detects a change in the operational status of the I/O ports, a link state update (01) LSPDU 300 is issued to communicatively coupled network devices (block 606). Upon issuing a link state update (01) type LSPDU, the controller awaits acknowledgement (11) type LSPDUs from all "known" network devices (e.g., those network devices with records in the link state protocol database) as shown in block 608. If an acknowledgement is not received from a known network device, the controller updates the record in the link state protocol database associated with the non-responding network device noting that the device/link may be unreliable or non-existent (block 610).

Those skilled in the art will appreciate from the foregoing description that the use of the link state protocol database of FIG. 2 and link state protocol data units of FIG. 3 by appropriately configured network devices enable a layer 2 data network to be managed much more efficiently, while facilitating a greater array of network services. It has been shown that the information provided by a LSPDU enables appropriately configured network elements to build and maintain complementary link state protocol databases (see FIG. 4) having common information concerning the link state of each of the active network devices. The complementary link state protocol database enable a network of such devices to dynamically manage the active topology of the data network without blocking or disabling duplicative network links, thereby facilitating the load sharing and Quality of Service attributes typically reserved for higher layer protocols.

In addition to the embodiments described above, those skilled in the art will appreciate that the teachings of the present invention may well be integrated with a single integrated circuit (not shown). That is, those skilled in the art will appreciate that advances in IC fabrication technology now enable complex systems to be integrated onto a single IC. Thus, in accordance with one embodiment of the present invention, the teachings of the present invention may be practiced within an application specific integrated circuits (ASIC), programmable logic devices (PLD), microcontroller, processor and the like.

While the innovative features for dynamically managing the active topology of a layer 2 data network of the present invention have been described in terms of the above illustrated embodiments, those skilled in the art will recognize that the invention is not limited to the embodiments described. The present invention can be practiced with modification and alteration within the spirit and scope of the appended claims. In particular, the present invention may be practiced with other features and/or feature settings. Particular examples of other features include but are not limited to transaction communication protocols and architectural attributes. Accordingly, the description is to be regarded as illustrative instead of restrictive on the present invention.

Thus, alternate methods and apparatus for dynamically controlling the provision of differentiated services incorporating the teachings of the present invention have been described.

What is claimed is:

1. A network device comprising:
    a link state protocol database including a plurality of records, each record including link state information; and
    a controller coupled to the link state protocol database, the controller to dynamically manage an active topology of a network based on network topology information including the link state information provided by an incoming link state protocol data unit including a type field and a link state protocol information field.

2. The network device of claim 1 further comprising input/output (I/O) ports coupled to the controller to receive the link state information.

3. The network device of claim 1, wherein the network topology information further includes incoming data received from a remote device.

4. A network device comprising:
    a plurality of input/output (I/O) ports;
    a link state protocol database including a plurality of records, at least one record including link state information and a record of the plurality of records of the link state protocol database includes an issue link field to denote a selected I/O port of the network device issuing the link state information; and
    a controller coupled to the link state protocol database and the plurality of I/O ports, the controller to dynamically manage an active topology of a network based on network topology information including the link state information.

5. The network device of claim 4, wherein the link state information is provided by an incoming link state protocol data unit.

6. The network device of claim 5, wherein the incoming link state protocol data unit includes a type field and a link state protocol information field.

7. The network device of claim 6, wherein the link state protocol information field includes status data of the I/O ports when the type field indicates that the incoming link state protocol data unit is a first type link state protocol data unit.

8. The network device of claim 6, wherein the link state protocol information field includes data to indicate a change of status of the I/O ports when the type field indicates that the incoming link state protocol data unit is a second type of link state protocol data unit.

9. The network device of claim 6, wherein the incoming link state protocol data unit includes a protocol identification field, a length field, a version field, and a source identification field.

10. The network device of claim 4, wherein the record of the plurality of records of the link state protocol database includes a metric field to provide a number of hops needed to reach the selected I/O port.

11. The network device of claim 4, wherein a record of the plurality of records of the link state protocol database includes an options field to denote if any service options are supported between the I/O ports.

12. The network device of claim 4, wherein a record of the plurality of records of the link state protocol database includes an age field to denote when information contained in the record has expired.

13. A network device comprising:
    a link state protocol database including a plurality of records, each record including link state information;
    a controller coupled to the link state protocol database, the controller to dynamically manage an active topology of a network based on network topology information including the link state information; and
    a filtering database coupled to the controller, the filtering database including a plurality of filtering records denoting at least distance vector information for a corresponding plurality of communication links of the data network.

14. The network device of claim 13, wherein the network topology information further includes the distance vector information.

15. The network device of claim 13, wherein the controller translates the link state information into routing cost and port state information, the routing cost and port state information being included in the filtering records.

16. Implemented within a network, a network device comprising:
    a plurality of input/output (I/O) ports;
    a link state protocol database including a plurality of records, each record including at least two of a receive link identification (ID) field, an advertising network device ID field, an issue link ID field, a length field, a metric field, an options field, an age field and a sequence number field; and
    a controller coupled to the plurality of I/O ports and the link state database, the controller to facilitate active control of a data link layer of the network without disabling the plurality of I/O ports.

17. A method comprising:
    receiving a management data unit by a network device;
    determining whether the management data unit is a link state protocol data unit;
    determining a type of a link state protocol data unit when the management data unit is the link state protocol data unit (LSPDU); and
    loading a corresponding entry in a link state protocol database with link state protocol information from the LSPDU.

18. The method of claim 17, wherein the link state protocol information denotes status of each input/output (I/O) port of the network device and links coupled thereto.

19. The method of claim 17, wherein the link state protocol information modifies a function of at least one input/output (I/O) port of the network device.

20. The method of claim 17, wherein determining of the type of the link state protocol data unit comprises:

determining whether the LSPDU is an acknowledgement type LSPDU.

21. The method of claim 17, wherein the loading of the corresponding entry in the link state protocol database includes refreshing age information contained within a source identification field of the acknowledgement type LSPDU.

\* \* \* \* \*